No. 863,387. PATENTED AUG. 13, 1907.
H. T. HALLOWELL.
METAL PULLEY.
APPLICATION FILED OCT. 13, 1902.
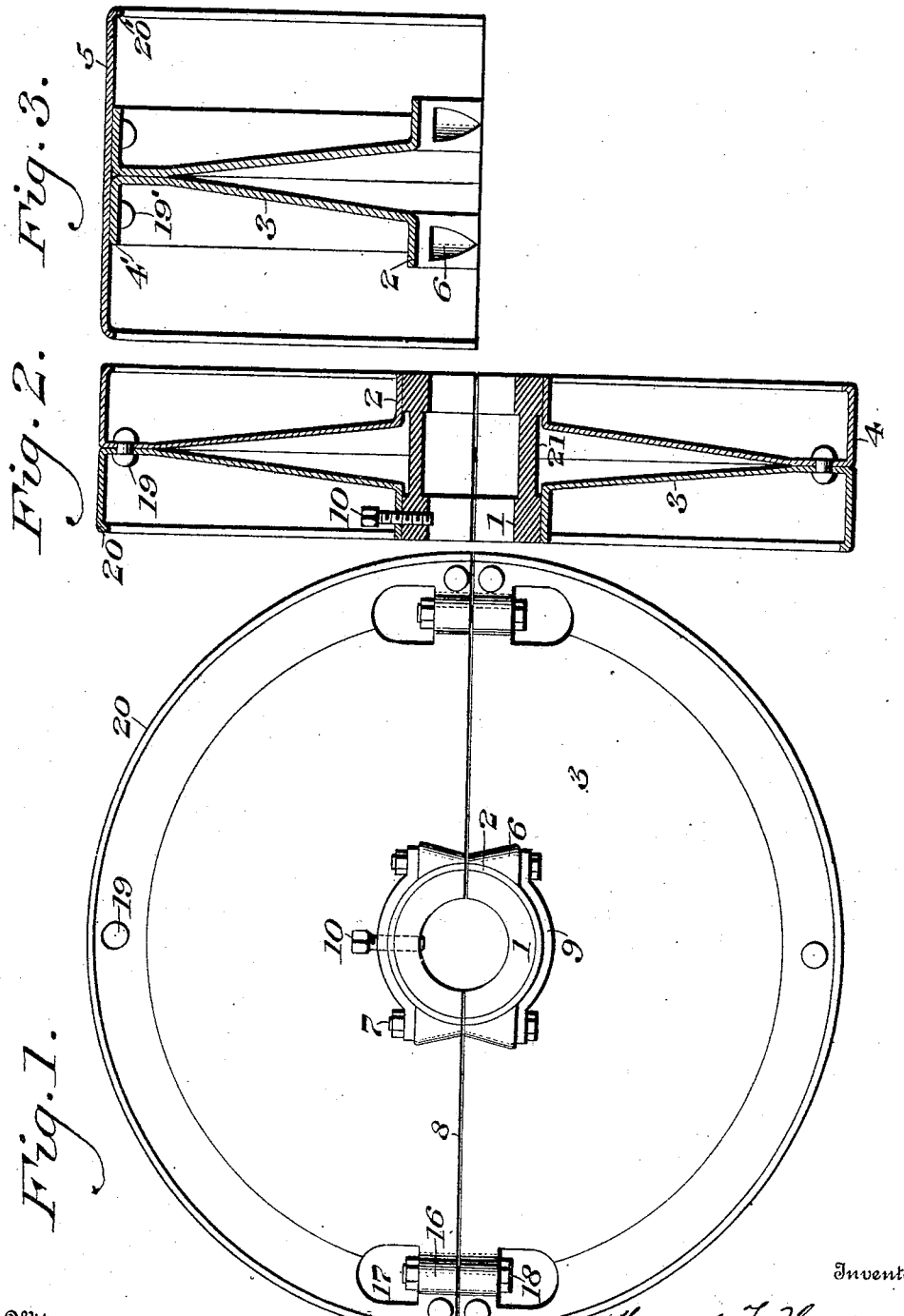
Witnesses
P. F. Nagle.
C. S. McVay.
Inventor
Howard T. Hallowell.
By Biedersheim Fairbanks.
Attorneys.

UNITED STATES PATENT OFFICE.

HOWARD T. HALLOWELL, OF DAVIS GROVE, PENNSYLVANIA, ASSIGNOR TO STANDARD PRESSED STEEL COMPANY, A CORPORATION OF PENNSYLVANIA.

METAL PULLEY.

No. 863,387.   Specification of Letters Patent.   Patented Aug. 13, 1907.

Application filed October 13, 1902. Serial No. 126,971.

*To all whom it may concern:*

Be it known that I, HOWARD T. HALLOWELL, a citizen of the United States, residing at Davis Grove, in the county of Montgomery, State of Pennsylvania, have invented a new and useful Improvement in Metal Pulleys, of which the following is a specification.

My invention consists in improvements in what is particularly known as belt pulleys, the object being to make a simple, strong, light and durable device.

Some of the features of construction herein disclosed are shown but not claimed in my application for patent, filed May 22, 1902, Serial No. 108,468.

The improvement will be more fully hereinafter described, shown in the drawings and then defined by the claims.

Figure 1 is a side elevation of a pulley embodying my invention, formed of sections. Fig. 2 is a transverse section of a pulley of a similar construction. Fig. 3 is a section of a portion of a pulley showing a modification of my invention.

Similar numerals of reference indicate corresponding parts in the figures.

Referring to the drawings:—1 indicates a bushing suitably secured to the hub 2 of the pulley, said hub 2 being cylindrical or tubular in shape and integral with disk or web 3. On the outer edges of this disk or web 3 I draw a flange making an outer or cylindrical tubular surface, which may be a belt bearing surface or rim 4, or a support for the same as rim 4'. If desired, however, I may reinforce this rim by a separate sheet or band 5, and secure the same in place as to the rim 4', whereby I am enabled to make a very wide face. In Fig. 1 I form integral clamp lugs or ears 6 on the hub, by which the bolts 7 are enabled to clamp the pulley firmly to the shaft when it is diametrically parted on line 8. In Fig. 1 I show separate bands or yokes 9 engaging the tubular hub, which may be employed for locking the sections together. However, in small pulleys I find these reinforcing bands 9 are unnecessary. The set screw 10 is shown in Fig. 1. This set screw is usually, however, unnecessary in a split pulley. The bushings employed may be of many shapes and may be solid or otherwise. In Fig. 1, or in a similar pulley, I prefer to make the pulley split. For large pulleys I prefer to use clamping means near the rim, and in this case I swage a portion of the web out, as at 16 and by piercing holes 17 to allow for the bolt head or nut, I am enabled to unite the parts by means of bolts 18, which fit in sockets swaged from web portions. 19 indicates rivets for securing the halves in position laterally. These pan-shaped sections fit together with their outer tubular surface in line.

In Fig. 2 I show how I may round the edges as 20, it being understood that this round may be made into a bead or dispensed with, if desired. In Fig. 2, I show how I may place bushings 1 in the tubular hubs, portions 21 of bushings being reduced to save turning, metal etc.

It will be understood that I do not limit myself to the precise construction shown, as slight improvements in detail may be made by those skilled in the art. Instead of making the disk 3 tapering from the tubular hub to the rim it is desirable in certain sized pulleys to make the same flat but by making webs divergent, I gain strength laterally, and this is preferred. The band 5 may be otherwise secured without departing from the spirit of the invention. It is better in making a split pulley, that the hub be parted diametrically.

Having thus described my invention, what I claim as new and desire to secure by Letters Patent, is:—

1. A pulley formed in sections, each section in halves, each half comprising in a single integral element a web, a rim, and a hub portion having lugs, and means for securing said lugs together for locking the sections in position with the web portions in close contact adjacent the rim.

2. A pulley formed in sections, each section in halves, and each half consisting of a semi-pan-shaped part, and comprising in a single integral element a rim, a hub and web portion connecting the hub and rim, yokes embracing the hub portions, and means securing said sections together adjacent the hub portions, with the web portions in close contact adjacent the rim.

3. A pulley formed in sections, each section being in halves and each half comprising in a single integral element, a web, a rim and a hub portion having lugs, means for securing said lugs together for locking the sections in position with the web portions in close contact adjacent the rim, there being ears between the halves adjacent the rim, and bolts passing through the ears of halves upon the same side of the pulley to unite them.

HOWARD T. HALLOWELL.

Witnesses:
  JOHN A. WIEDERSHEIM,
  WM. CANER WIEDERSHEIM.